US010038524B2

(12) United States Patent
Wei

(10) Patent No.: US 10,038,524 B2
(45) Date of Patent: Jul. 31, 2018

(54) COORDINATED SET SELECTING METHOD AND DEVICE

(71) Applicant: Sony Corporation, Tokyo (JP)

(72) Inventor: Yuxin Wei, Beijing (CN)

(73) Assignee: Sony Corporation, Tokyo (JP)

(*) Notice: Subject to any disclaimer, the term of this patent is extended or adjusted under 35 U.S.C. 154(b) by 17 days.

(21) Appl. No.: 15/044,845

(22) Filed: Feb. 16, 2016

(65) Prior Publication Data

US 2016/0164650 A1 Jun. 9, 2016

Related U.S. Application Data

(63) Continuation of application No. 14/127,773, filed as application No. PCT/CN2012/074964 on May 2, 2012, now Pat. No. 9,401,785.

(30) Foreign Application Priority Data

Jun. 28, 2011 (CN) .......................... 2011 1 0190226

(51) Int. Cl.
*H04L 5/00* (2006.01)
*H04W 72/04* (2009.01)
(Continued)

(52) U.S. Cl.
CPC ........ *H04L 5/0035* (2013.01); *H04J 11/0053* (2013.01); *H04L 5/0023* (2013.01);
(Continued)

(58) Field of Classification Search
CPC .............. H04J 11/0053; H04L 5/0035; H04W 72/0426; H04W 48/20
See application file for complete search history.

(56) References Cited

U.S. PATENT DOCUMENTS 9,137,726 B2 * 9/2015 Kwon .................. H04L 1/0002
2010/0246524 A1 9/2010 Hou et al.
(Continued)

FOREIGN PATENT DOCUMENTS

CN 101951307 1/2011
JP 2011-82709 4/2011
(Continued)

OTHER PUBLICATIONS

Soon Yil Kwon, Han Byul Seo, Hak Seang Kim and Ki Jun Kim, Method of Clustering Cells for CoMP Operation,U.S. Appl. No. 61/165,906 dated Apr. 2, 2009, 1-10.*
(Continued)

*Primary Examiner* — Noel R Beharry
*Assistant Examiner* — Wilfred Thomas
(74) *Attorney, Agent, or Firm* — Oblon, McClelland, Maier & Neustadt, L.L.P.

(57) ABSTRACT

Disclosed are a coordinated set selecting method and device, which are applicable to a wireless communication system. The coordinated set selecting method comprises the following steps: determining a transmission manner adopted by a wireless communication system, the transmission manner being joint processing or coordinated scheduling/beamforming; and, directed to the transmission manner adopted by the wireless communication system, selecting a coordinated set according to a coordinated set selecting mechanism adapting to the transmission manner. According to the technical solution of the present invention, by considering transmission characteristics of different transmission manners, a reasonable coordinated set is selected to perform coordinated multi-point transmission.

15 Claims, 3 Drawing Sheets

(51) Int. Cl.
*H04W 48/20* (2009.01)
*H04J 11/00* (2006.01)
*H04B 7/02* (2018.01)
*H04B 7/024* (2017.01)

(52) U.S. Cl.
CPC ....... *H04W 48/20* (2013.01); *H04W 72/0426* (2013.01); *H04B 7/024* (2013.01)

(56) References Cited

U.S. PATENT DOCUMENTS

| | | | |
|---|---|---|---|
| 2011/0034163 A1* | 2/2011 | Zhu | H04B 7/022 455/422.1 |
| 2011/0034175 A1* | 2/2011 | Fong | H04B 7/024 455/450 |
| 2011/0044272 A1 | 2/2011 | Cui et al. | |
| 2011/0098054 A1 | 4/2011 | Gorokhov et al. | |
| 2011/0171955 A1* | 7/2011 | Acharya | H04W 84/042 455/434 |
| 2011/0255436 A1 | 10/2011 | Jian et al. | |
| 2011/0274047 A1* | 11/2011 | Kwon | H04W 52/40 370/328 |
| 2011/0281585 A1 | 11/2011 | Kwon et al. | |
| 2011/0292983 A1* | 12/2011 | Ito | H04L 5/0023 375/224 |
| 2012/0087273 A1* | 4/2012 | Koo | H04B 7/024 370/252 |
| 2012/0142352 A1 | 6/2012 | Zhang et al. | |
| 2012/0207055 A1 | 8/2012 | Kang | |
| 2012/0302281 A1 | 11/2012 | Takano | |
| 2012/0315917 A1* | 12/2012 | Comeau | H04W 72/048 455/456.1 |
| 2014/0011531 A1 | 1/2014 | Burstrom et al. | |

FOREIGN PATENT DOCUMENTS

| | | | |
|---|---|---|---|
| JP | 2011-82833 | 4/2011 | |
| WO | WO 2010/087619 A2 | 8/2010 | |
| WO | 2010 148536 | 12/2010 | |
| WO | 2011 004947 | 1/2011 | |
| WO | 2011/052067 | 5/2011 | |
| WO | WO 2011052965 A2 * | 5/2011 | .......... H04W 52/146 |

OTHER PUBLICATIONS

International Search Report dated Aug. 16, 2012 in PCT/CN12/074964 Filed May 2, 2012.
"CoMP Operation Framework" Motorola, TSG-RAN WG1 #56bis, R1-091341, Mar. 23-27, 2009, 4 Pages.
Li Qiang 1, Yang Yang, Fang Shu, Wu Gang, SLNR Precoding based on QBC with Limited Feedback in Downlink CoMP System 2010 IEEE, pp. 1-5.
Notice of Rejection dated Feb. 17, 2015 to Japanese Patent Application No. 2014-517405, with English translation.
Decision of Refusal dated Jul. 7, 2015 to Japanese Patent Application No. 2014-517405, with English translation.
Decision to Grant a Patent dated Dec. 8, 2015 to Japanese Patent Application No. 2014-517405, with English translation.

* cited by examiner

COORDINATED SET SELECTING METHOD AND DEVICE

CROSS-REFERENCE TO RELATED APPLICATIONS

This application is a Continuation of U.S. patent application Ser. No. 14/127,773 filed Dec. 19, 2013, which is a National Stage Application of PCT Application No. PCT/CN2012/074964 filed May 2, 2012, which claims priority to Chinese Patent Application No. 201110190226.9 filed Jun. 28, 2011. The entire contents of U.S. patent application Ser. No. 14/127,773 is incorporated herein by reference in its entirety.

FIELD OF THE INVENTION

The present invention relates to the field of communication technology, more particularly to a cooperating set selection method and apparatus, and especially to a cooperating set selection method under Coordinated Multi-Point transmission in a Long Term Evolution—Advanced (LTE-A) system for example.

BACKGROUND OF THE INVENTION

The Coordinated Multi-Point (COWP) transmission is considered to be an important technology in the LET-A, the application of which can expand a range of high speed transmission area in a cell, effectively improve throughput of cell-edge users and appropriately improve overall throughput of the system. As compared with a traditional case in which an user terminal is served only by one transmission node (a base station or other entity having a function of data transmission and reception), the Coordinated Multi-Point transmission is capable of providing simultaneously services of both control and data transmission to the user terminal through dynamic collaboration and coordination among multiple transmission nodes which are separated physically.

Currently, there are mainly two Coordinated Multi-Point transmission modes: Joint Processing (JP) and Coordinated Scheduling/Beamforming (CS/CB). The Joint Processing means that the data to be transmitted exists at each transmission node and may be further divided into Joint Transmission (JT) and Dynamic Cell Selection (DCS). Joint Transmission refers to transmitting Physical Downlink Shared Channel (PDSCH) from multiple transmission nodes simultaneously at the same time instant, which means that the data to the same terminal is transmitted from multiple transmission nodes simultaneously so as to improve signal quality of received data or eliminate interference from other terminals. Dynamic Cell Selection refers to transmitting PDSCH only from one transmission node at the same time instant. Coordinated Scheduling/Beamforming means that data only exists in a service cell, but the user's decision of scheduling and beamforming is determined depending on relevant information of all the cells within the cooperating set collectively.

As can be seen from above, there will exist a cooperating set both for the Joint Processing and the Coordinated Scheduling/Beamforming. Particularly, in case of Joint Processing, the cooperating set refers to a set of transmission nodes directly or indirectly involved in data transmission (in case of the data transmission mode of Dynamic Cell Selection, data transmission is dynamically accomplished by multiple transmission nodes collaboratively although only one transmission node performs data transmission each time). In case of Coordinated Scheduling/Beamforming, the cooperating set refers to a set of cells sharing the decision of scheduling and beamforming for that cell. In theory, the larger the cooperating set is the higher the resulting performance gain is. However, from the viewpoint of cost performance, the larger the cooperating set is, the greater the amount of data required to be transmitted among cooperating sets is, and especially for the transmission mode of Joint Processing, not only control information among cells but also a large amount of data to be transmitted need to be transferred among cooperating sets. Thus, if a physical link with high capacity and low delay is not utilized among cooperating sets, then data transmission delay among cooperating sets will be resulted therefrom, thus affecting timeliness and effectiveness of Coordinated Multi-Point transmission decision and further affecting performance. It can be seen that how to appropriately select the cooperating set is a problem that has to be solved.

SUMMARY OF THE INVENTION

Hereinafter, a brief summarization about the present invention is given, so as to provide basic understanding of some aspects of the present invention. However, it should be understood that this summarization is not an exhaustive summarization about the present invention. It does not intend to be used to either determine a key or important part of the present invention or define the scope of the present invention. Its object is only to give some concepts about the present invention in a simplified form and hereby acts as a preamble of more detailed descriptions which will be presented later.

In view of the foregoing situation in the prior art, an object of the invention is to provide a cooperating set selection method and apparatus which can solve or alleviate one or more of the existing technical problems.

In order to achieve the above object, according to one aspect of the invention, there is provided a cooperating set selection method for a wireless communication system, the method including the steps of: determining a transmission mode utilized by the wireless communication system, where the transmission mode is Joint Processing or Coordinated Scheduling/Beamforming: and selecting a cooperating set based on a cooperating set selection mechanism corresponding to the transmission mode utilized by the wireless communication system.

According to another aspect of the invention, there is also provided a cooperating set selection apparatus for a wireless communication system, the apparatus including: a transmission mode determining unit, configured to determine a transmission mode utilized by the wireless communication system, where the transmission mode is Joint Processing or Coordinated Scheduling/Beamforming; and a cooperating set selecting unit, configured to select a cooperating set based on a cooperating set selection mechanism corresponding to the transmission mode utilized by the wireless communication system.

According to another aspect of the invention, there is also provided a computer program product for implementing the cooperating set selection method described above.

According to another aspect of the invention, there is also provided a computer-readable medium on Which computer program codes for implementing the cooperating set selection method described above are recorded.

According to the technical solutions of the invention, an appropriate cooperating set is selected to perform Coordinated Multi-Point transmission by taking transmission characteristics of different transmission modes into account.

BRIEF DESCRIPTION OF THE DRAWINGS

The present invention may be better understood with reference to the detailed description given in conjunction with the accompany drawings as follows. Throughout all the accompany drawings, identical or similar reference numerals are used to represent identical or similar components. The accompany drawings together with the following detailed description are contained in the present specification and form part of the specification, for further illustrating the preferable embodiments of the present invention and explaining the principles and advantages of the present invention by way of example, in which.

Figure 1:
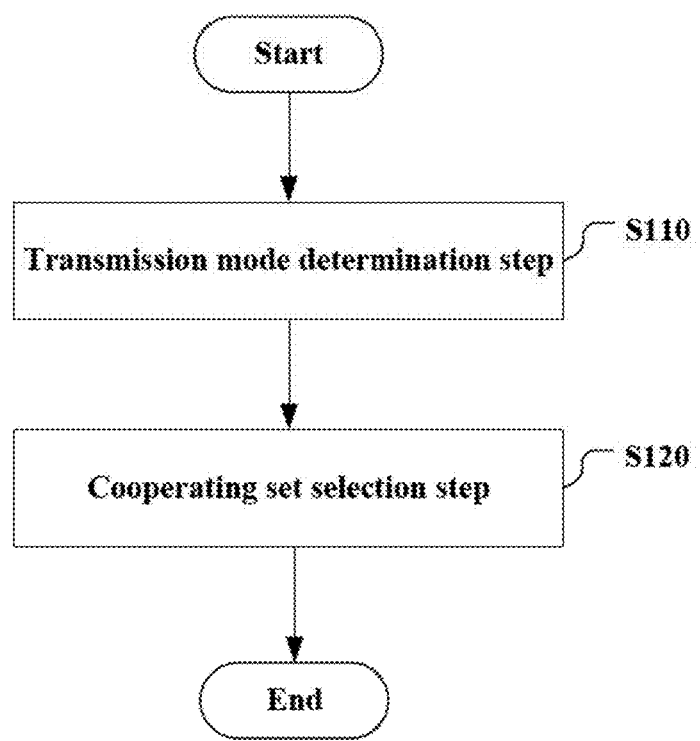
FIG. 1 illustrates a flow chart of a cooperating set selection method according to an embodiment of the invention.

The skilled in the art should understand that, the elements in the accompany drawings are only shown for the sake of simplicity and clarity but not necessarily drawn to scale. For example, sizes of some elements in the accompany drawings may be enlarged relative to other elements so as to help to improve the understanding of the embodiments of present invention.

DETAILED DESCRIPTION OF THE INVENTION

Exemplary embodiments of the present invention will be described below in conjunction with the accompanying drawings. For the sake of simplicity and clarity, not all of the features of practical implementations are described in the specification. However, it should be understood that during developing any of such practical implementations, many implementation-specific decisions should be made in order to achieve a specific object of a developer, for example to conform to the limitations relevant to a system or business, and those limitations may vary with different implementations. Moreover, it should also be understood that although the development work may be very complicated and time consuming but may simply be a routine task for those skilled in the art benefiting from this disclosure.

It shall further be noted that only those device structures and/or process steps closely relevant to the solutions of the invention are illustrated in the drawings while other details less relevant to the invention are omitted so as not to obscure the invention due to those unnecessary details.

The cooperating set selection method according to the embodiment of the invention will be described in detail with reference to the accompanying drawings below.

FIG. 1 illustrates a flow chart of a cooperating set selection method according to an embodiment of the invention. This method is used in a wireless communication system. As shown in FIG. 1 the cooperating set selection method according to the embodiment of the invention may include a transmission mode determination step S110 and a cooperating set selection step S120.

First, in the transmission mode determination step S110, a transmission mode utilized by the wireless communication system is determined, where the transmission mode is Joint Processing (JP) or Coordinated Scheduling/Beamforming (CS/CB). Particularly, the transmission mode utilized by the wireless communication system may be determined by reading configuration information of the system, for example.

Next, in the cooperating set selection step S120, for the transmission mode utilized by the wireless communication system, a cooperating set is selected based on a cooperating set selection mechanism corresponding to the transmission mode with consideration of its transmission characteristics.

Preferably, the wireless communication system includes a homogenous network and a heterogeneous network, and in the selection of the cooperating set, a cooperating set selection mechanism for the homogeneous network or the heterogeneous network is utilized further according to different interference characteristics of the homogeneous network and the heterogeneous network.

According to the above description of the cooperating set selection method of the invention, under enlightenment of the above description, those skilled in the art may design corresponding cooperating set selection mechanisms by taking respective transmission characteristics of different transmission modes and/or different interference characteristics of the homogeneous network and heterogeneous network into account. Specific embodiments of selecting the cooperating set by utilizing the cooperating set selection mechanisms corresponding to respective transmission characteristics of different transmission modes and/or different interference characteristics of the homogeneous network and heterogeneous network will be given below. However, it is clear to those skilled in the art that the invention is not limited to the following, specific embodiments.

Cooperating Set Selection In Case Of Coordinated Scheduling/Beamforming

The cooperating set in case of Coordinated Scheduling/Beamforming refers to a set of transmission nodes providing their own scheduling/beamforming information in order to make the decision of scheduling/beamforming. The selection manner of cooperating set is divided into a cell-based manner and a terminal-based manner. The cell-based cooperating set means that the cooperating sets of all the terminals within a coverage range of a certain cell are the same. The terminal-based cooperating set means that a specific cooperating set is selected for different terminals, and the cooperating set of each terminal may be different. From the viewpoint of performance, the terminal-based selection of cooperating set can achieve better performance but may need more interaction between the base station and the terminal. Both manners have their respective advantages and disadvantages, and the selection of cooperating set in the two manners will be described respectively below.

1) The Cell-Based Selection of Cooperating Set

For the homogeneous network, for a cell in question, cells whose distances from the cell in question are smaller than a predetermined distance threshold are selected as the cooperating set based on a distance criterion. Particularly, for the cell in question j, its cooperating set CandidateCellSet(j) is constituted by cells satisfying the following conditions: $\forall i$, $|dist(i, j)| \leq MaxDist$, then $i \in CandidateCellSet(j)$, where i is any cell, $dist(i, j)$ denotes a physical distance between centers of the cell i and the cell j, and MaxDist denotes a maximum physical distance threshold, the setting of which may be obtained from actual measurements in the process of engineering practice.

Figure 2:
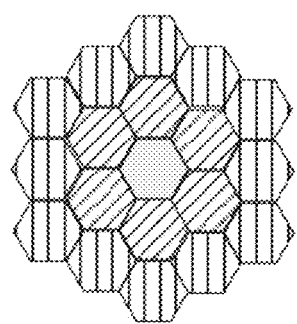
FIG. 2 illustrates an exemplary schematic diagram of cooperating set selection for a homogenous network in case of Coordinated Scheduling/Beamforming.

In one example, as shown in FIG. 2, the cooperating set of the cell in question (the central cell in FIG. 2) is constituted by its neighboring cells (cells with oblique lines in FIG. 2) and neighboring cells of its neighboring cells (cells with upright lines in FIG. 2). For an user terminal located at the edge of the central cell, it is far from the transmission node, its received signal has a large attenuation and very serious interference from neighboring cells, therefore the focus point of Coordinated Scheduling/Beamforming is to avoid user terminals of the neighboring cells from being allocated to the same resources (time, frequency and space resources). Thus the relevant scheduling information of the neighboring cells (the cells with oblique lines in FIG. 2) has to be shared. While joint scheduling is executed for a terminal located in the central cell but near to the cells with oblique lines and a terminal located in the cells with oblique lines but near to the cells with upright lines, the result of the joint scheduling may affect the performance of the terminal located in the cells with upright lines. Therefore, it will facilitate improving overall throughput of the system if the relevant scheduling information of neighboring cells (cells with upright lines in FIG. 2) of the neighboring cells is shared.

For the heterogeneous network: a cooperating set is selected, besides based on the distance criterion, further based on whether the cell in question is a macro cell or a micro cell and whether the macro cell and the micro cell use a same cell number.

Figure 3:
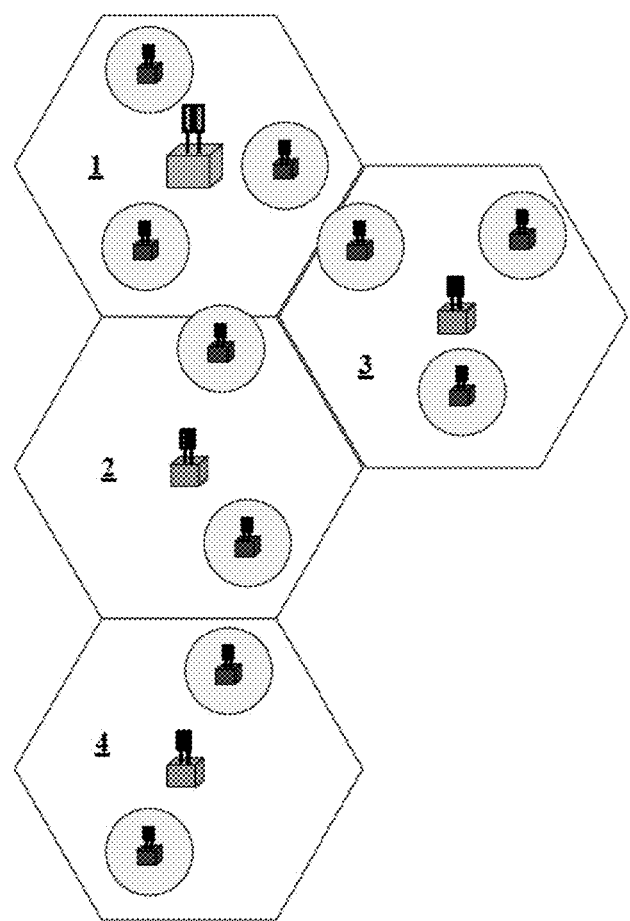
FIG. 3 illustrates an exemplary schematic diagram of cooperating set selection for a heterogeneous network in case of Coordinated Scheduling/Beamforming.

In one example, if a macro cell and small base stations (Pico cells) or radio frequency transmission apparatuses (RRHs, Remote Radio Heads) within the coverage range of this macro cell use the same cell identification (Cell ID), then resources are shared among this macro cell and these small base stations or radio frequency transmission apparatuses, and they can be regarded as the same cell (although manners for using these resources may be different). The cooperating set of this macro cell may for example be constituted by its neighboring macro cells and cells formed by the small base stations and radio frequency transmission apparatuses within these neighboring macro cells as well as neighboring macro cells of these neighboring macro cells. As shown in FIG. 3, a macro cell 1 and three micro cells within its coverage range use the same cell identification, and the cooperating set of the macro cell 1 is constituted by its neighboring macro cells (macro cells 2 and 3) and all the micro cells within these macro cells as well as neighboring macro cells (a macro cell 4) of its neighboring macro cells.

If the macro cell and the small base stations (Pico cells) or the radio frequency transmission apparatuses (RRHs, Remote Radio Heads) within the coverage range of this macro cell use different cell identifications (Cell IDs), then resources are multiplexed among this macro cell and these small base stations or radio frequency transmission apparatuses, and they may be regarded as different cells (manners for using these resources may be different). The cooperating set of this macro cell may for example be constituted by cells formed by small base stations and radio frequency transmission apparatuses within coverage range of this macro cell, cells formed by neighboring Macro cells and small base stations and radio frequency transmission apparatuses within these neighboring macro cells, and neighboring macro cells of these neighboring macro cells. As shown in FIG. 3, the macro cell 1 and three micro cells within its coverage range use different cell identifications, and the cooperating set of the macro cell 1 is constituted by three micro cells within the coverage range of the macro cell 1, neighboring macro cells (macro cells 2 and 3) and all the micro cells within these neighboring macro cells as well as neighboring macro cells (the macro cell 4) of its neighboring macro cells.

For the micro cells formed by the small base stations and radio frequency transmission apparatuses, their cooperating sets are constituted by the macro cell in which the micro cell is located (when the micro cell and the macro cell use different cell identifications) and neighboring macro cells of this macro cell. As shown in FIG. 3, the cooperating set of the micro cells within the macro cell 1 is constituted by the macro cell 1 (when the micro cell and the macro cell 1 use different cell identifications) and neighboring macro cells of the macro cell 1 (macro cells 2 and 3).

Apparently, the present invention is limited to the above described examples, those skilled in the art may design cooperating set selection mechanisms being different from this example in accordance with the criteria described above.

2) The Terminal-Based Selection of Cooperating Set

For the terminal-based selection of cooperating set, it is necessary to dynamically determine the terminal's cooperating set with respect to a position at which each terminal is currently located and its interference circumstance. The overall flow is to first select candidate cooperating sets for this terminal (i.e., the terminal in question) and then to select its cooperating set from the candidate cooperating sets in accordance with a certain criteria. For the selection of the candidate coordinate sets, it may be considered to take the cooperating sets which are selected, on the basis of the cell in which the terminal is located (i.e., the cell in question), according to whether the current network topology is homogeneous or heterogeneous, by utilizing the above cell-based cooperating set selection method, as the candidate cooperating sets. In the further selection, a Signal to Leakage and Noise Ratio (SLNR) criteria is taken into account in that SLNR's physical meaning represents a ratio of a signal strength of a terminal to signal leakage and noise, the larger the value of SLNR is, the stronger the signal of the current terminal is, and the smaller the signal leakage incurred to other terminals is, thus the smaller the interference on other terminals is. From the viewpoint of cooperating set selection, the smaller the SLNR of the terminal is, the larger the interference on other terminals may be, then respective scheduling information needs to be exchanged between two cells to avoid possible interference so as to avoid the interference on other terminals from the current terminal. The specific selection strategy is as follows:

For a certain existing user terminal, with respect to all the cells belonging to the candidate cooperating sets, i.e., $\exists i$, $\forall j \in$ CandidateCellSet, i denotes a certain terminal j denotes a certain cell, and CandidateCellSet denotes a set of all the candidate cells, it is calculated as follows:

$$SLNR_{ij} = \frac{\|H_{i,i} w_i\|^2}{N_r \sigma^2 + \sum_{k \in j, k \neq i} \|H_{i,k} w_i\|^2}$$

Where k denotes an User terminal located within the coverage range of the cell j, $H_{i,k}$ denotes a channel matrix of $N_r \times N_t$ of the cell in which user terminal i is located and the user terminal within the cell j, $N_t$ denotes the number of transmission antennas of a cell, $N_r$ denotes the number of reception antennas of the user terminal, $w_i$ denotes a beamforming matrix, and $\sigma^2$ denotes a variance of Gaussian White noise.

According to the calculated SLNR value, if this value is lower than a certain threshold δ (which may be obtained from measurements in the process of engineering practice), then the cell j will be selected into the cooperating set of this terminal.

Cooperating Set Selection in Case of Joint Processing

First, the cooperating set selection for Joint Transmission scenario is described. The cooperating set selection for Joint Transmission is more complex than the cooperating set selection for Coordinated Scheduling/Beamforming. The reason is that the cooperating set selection for Joint Transmission includes not only the selection of a set of cells which share control information with each other, but also includes the selection of a cooperating set cells which share transmission data. The quantity of data to be shared is very large, thus if the cooperating set is very large, then the amount of data transmitted among the cooperating sets will be very large, thereby resulting in a very large transmission delay and further affecting performance of the system. Meanwhile, it also needs to consider a multi-user transmission mode in case of Joint Transmission, thus to form a multi-base station and multi-user transmission mode and the performance of the system can be further improved. Therefore, the cooperating set should include a multi-base station and multi-user set forming the Joint Transmission.

The general flow of cooperating set selection is as follows: first a candidate cooperating set is selected, and then a cooperating cell-user pair set is selected on the basis of the selected candidate cooperating set to form a multi-cell and multi-user transmission mode. Detailed flows of respective steps are introduced below.

Candidate Cooperating Set Selection: The cells and terminals which will participate in joint transmission will be further selected from the cells in the candidate cooperating set and terminals within the cells. Considering the difference between the homogeneous network and the heterogeneous network, candidate coordinated cell selection strategies under different network architectures will be considered separately below.

1) For the homogeneous network: the joint transmission mode means that certain terminal(s) are able to receive signals from multiple cells simultaneously, which means that these cells can't be very to away from each other. Therefore, the candidate cooperating set is constituted by cells whose geographical distance is not beyond a certain threshold. It may be expressed as follows: for a certain cell j, its candidate cooperating set CandidateCellSet(j) is constituted by cells satisfying the following conditions: $\forall i, |dist(i,j)| \leq MaxDist$, then i∈CandidateCellSet(j) is any cell, dist (i,j) denotes calculation of a physical distance between centers of the cell i and the cell j, and MaxDist denotes the maximum physical distance threshold, the setting of which may be obtained from actual measurements in the process of engineering practice.

2) For the heterogeneous network: it is unsuitable to use the foregoing physical distance method to select the candidate cooperating set for the reason that: first, the transmission power of the macro cell and the micro cell are generally different, and the transmission power of the base station in the micro cell is smaller than that of the base station in the macro cell, thus the coverage ranges of the macro cell and the micro cell are different, and the signal attenuation for the users at the edge of the cell is also different. Therefore, with respect to a macro cell and a micro cell which is as far away from a certain cell as the macro cell is, the signal qualities of the macro cell and the micro cell for a terminal within the certain cell may be completely different. In addition to the effect of the distance, there may be also interference on the terminals within the macro cell due to the existence of the micro cell. Meanwhile, the base stations in the macro cell are also main sources of the interference on the terminals within the micro cell, thus the signal quality criteria should be used to select the candidate cooperating set. In one example, for a certain cell, i.e. first cell, the suitable cells are selected into the candidate cooperating set according to the signal quality criteria, wherein a difference between the signal quality of an edge user in the first cell served by the suitable cell and the signal quality of the edge user served by the first cell is no more than a predetermined difference threshold. In a specific embodiment, the candidate cooperating set is constituted by the cells whose signal with the Signal to Interference and Noise Ratio (SINR) large enough for the terminals at the edge of the certain cell. In a specific embodiment, the difference of the Signal to Interference and Noise Ratio (SINR) of signal received by the terminals at the edge of the first cell from the first cell and the SINR of signal received from the suitable cell is not larger than a certain threshold. It may be expressed as follows: for a certain cell j, its candidate cooperating set CandidateCellSet(j) is constituted by cells satisfying the following conditions: $\exists k \in j$, $\forall i, |SINR(k, j) - SINR(k,i)| \leq MaxSINRDiff$, then i∈CandidateCellSet(j), i denotes any cell k denotes a certain terminal located at the edge of the cell j, SINR(k, j) denotes calculation of SINR of the cell j received by the terminal k, and MaxSINRDiff denotes the maximum differential value of SINR, the setting of which may be obtained from actual measurements in the process of engineering practice. It is to be noted that the measurement of the signal quality is not limited to the use of SINR, other manners such as Signal to Noise Ratio (SNR), etc. may also be used to measure the signal quality.

Cell-User Set Selection: a certain number of terminals are selected from the terminals within the above obtained candidate cooperating set according to a predetermined criteria to form a set for joint transmission together with these candidate coordinated cells. The specific flow is as follows:

1) For the Homogeneous Network:

a) assuming that the number of the cells in the selected candidate cooperating set is M, L cells are selected from these Al cells randomly which are $j_1, j_2, \ldots j_L$ respectively, and the total number of the terminals within these L cells is $L_N$, which are $t_1, t_2, \ldots t_{LN}$ respectively. K terminals $u_1, u_2, \ldots u_K$ (K<L) are selected from the $L_N$, terminals randomly, each cell should serve at least one terminal, and since the number of the cells is larger than the number of the terminals, then at least one terminal is served by multiple cells simultaneously, thereby forming Coordinated Multi-Point transmission. Thus, the number of possibilities for paring these terminals with candidate coordinated cells is $K^L$.

b) First the cell-user set with a better channel orthogonality is selected. For example, for a group of candidate sets (U, J), where U=$u_1, u_2, \ldots u_K$, J=$j_1, j_2, \ldots j_L$, and a combination satisfying the following conditions is calculated, i.e., $\forall j_m, j_{m'} \in J$, $\forall u_k, u_{k'} \in U$, and $j_m \neq j_{m'}, u_k \neq u_{k'}$, then $\|H_{j_m u_k} H_{j_{m'} u_{k'}}^H\| \leq R$, $H_{j_m u_k}$ is the channel matrix from the cell $j_m$ to the user $u_k$, and R is obtained from actual measurements in the process of engineering practice. Thus, a preferable cell-user set (U', J') with a better channel orthogonality is obtained, where U'=$u_1, u_2, \ldots u_K$, J'=$j_1, j_2, \ldots j_L$.

c) A cell-user combination (U", J") with a best overall signal quality is selected from (U', J'). In one example, a cell-user combination (U", J") which makes the following value be maximum is selected from (U', J'), i.e., $$(U'', J'') = \operatorname{argmax} \sum_{\substack{u_k \in U' \\ j_m \in J'}} SINR(u_k, j_m),$$

where SINR($u_k$, $j_m$) denotes the SINR of the user $u_k$. It is to be noted that those skilled in the art may perform calculation by selecting other calculation expressions which can express the overall signal quality of the cell-user pair set (for example, weighting, averaging, etc. the above expressions or other variations) in accordance with the spirit of the invention, and the measurement of the signal quality is not limited to the use of SINR, other manners such ac SNR etc. may also be used to measure the signal quality.

d) Steps of a) to c) are repeated until the loop ends and the best cell-user combination (U", J") is selected, 2) For the heterogeneous network: the cell-user selection in case of the heterogeneous network has its speciality in that in the case of the heterogeneous network, if only the criteria of channel orthogonality and signal quality is used to determine the pairing performance of the cell-user, since the transmission power of the macro cell and the micro cell are different in the heterogeneous network, the macro cell is an important factor for resulting in signal interference on the micro cell, and if the candidate cooperating set includes not only the macro cells but also the micro cells, it is possible that the signal quality of the terminals within the macro cells is very good but these terminals may severely interfere with the micro cells, thus if only the signal quality criteria is used, then the performance of the terminals within the micro cells can not be ensured and it is not facilitated to improve the overall performance of the system. Accordingly, it should also be considered to decrease the signal leakage to the micro cells from the terminals within the macro cells as much as possible on the basis of the use of signal quality criteria. Considering the speciality of the heterogeneous network, the flow of cell-user selection is as follows:

a) Assuming that the number of the cells in the selected candidate cooperating set is M, L cells are selected from these M cells randomly which are $j_1, j_2, \ldots j_L$ respectively, and the number of the terminals within these L cells is $L_N$, which are $t_1, t_2, \ldots t_N$ respectively. K terminals $u_1, u_2, \ldots u_K$ (K<L) are selected from the $L_N$ terminals randomly, each cell should serve at least one terminal, and since the number of the cells is larger than the number of the terminals, then at least one terminal is served by multiple cells simultaneously, thereby forming Coordinated Multi-Point transmission. Thus, the number of possibilities for paring these terminals with candidate coordinated cells is $K^L$.

b) First the cell-user set with a better channel orthogonality is selected. For example, for a group of candidate sets (U, J), where U=$u_1, u_2, \ldots u_K$, J=$j_1, j_2, \ldots j_L$, and a combination satisfying the following conditions is calculated, i.e., $\forall j_m, j_m \in J$, $\forall u_k, u_k \in U$, and $j_m \neq j_{m'}$, $u_k \neq u_{k'}$, then $\|H_{j_m,u_k} H_{j_{m'},u_k}{}^H\| \leq R$, $H_{j_m,u_k}$ is the channel matrix from the cell $j_m$ to the user $u_k$, and R is obtained from actual measurements in the process of engineering practice. Thus, a preferable cell-user set (U', J') with a better channel orthogonality is obtained, where U'=$u_1, u_2, \ldots u_K$, J'=$j_1, j_2, \ldots j_L$.

c) A cell-user combination (U", J") which makes the overall signal quality of the system be best is selected from (U', J'). In one example, a cell-user combination (U", J") winch makes the following value be maximum is selected from (U', J'), i.e., $$(U'', J'') = \operatorname{argmax} \sum_{\substack{u_k \in U' \\ j_m \in J'}} SINR(u_k, j_m),$$

where SINR($u_k$, $j_m$) denotes the SINR of the user $u_k$. It is to be noted that those skilled in the art may perform calculations by selecting other calculation expressions which can express the overall signal quality of the cell-user pair set (for example, weighting, averaging, etc. the above expression or other variations) in accordance with the spirit of the invention, and the measurement of the signal quality is not limited to the use of SINR, other manners such as SNR etc. may also be used to measure the signal quality.

d) Cell-user pair sets in which the interference on the micro cells caused by the macro cells is lower than a predetermined interference threshold is selected from (U", J"). In one example, $\forall \text{MacroCell}(j) \subset J''$, $\forall \text{MicroCell}(j) \subset J''$, MacroCell denotes a set of macro cells contained in U", MicroCell denotes a set of micro cells contained in U", and it is calculated whether the following condition is satisfied:

$$\sum_{\substack{i \in \text{MacroCell}(j) \\ k \in U''}} \sum_{k \in \text{MicroCell}(j)} \|H_{i,k} w_i\|^2 \leq Q$$

Where k denotes an user terminal located within the coverage range of the micro cell j and belonging to U", $H_{i,k}$ denotes a channel matrix of the cell i and the user terminal k, $w_i$ is a beamforming matrix, and Q is obtained from actual measurements in the process of engineering practice. If the condition is not satisfied, then c) is repeated, and the second-optimal cell-user set (U", J") is selected.

e) Steps of a) to d) are repeated until the loop ends and the best cell-user combination (U", J") is selected.

The cooperating set selection in case of Dynamic Cell Selection may be similar to that in case of Joint Transmission, and the difference therebetween is that there is a limitation in the process of performing cell-user pairing in the cooperating set selection in case of Dynamic Cell Selection, i.e., if a certain user has been paired with a certain cell, then other cells can not be paired with this user. Therefore, the detailed description about the cooperating set selection in case of Dynamic Cell Selection will be omitted herein.

The cooperating set selection method according to the embodiment of the invention has been described in detail in combination with the drawings. The cooperating set selection apparatus according to the embodiment of the invention will be described in combination with the drawings below.

Figure 4:
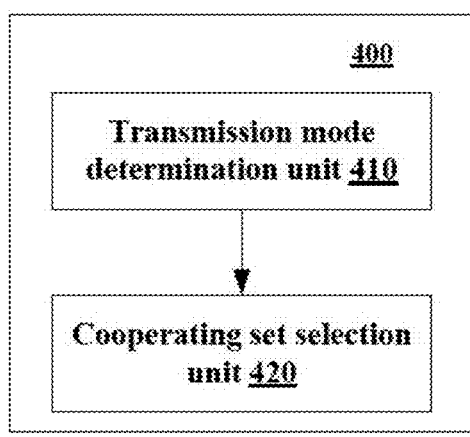
FIG. 4 illustrates a block diagram of a cooperating set selection apparatus according to an embodiment of the invention.

FIG. 4 illustrates a block diagram of the cooperating set selection apparatus according, to an embodiment of the invention, in which only those portions closely relevant to the invention are shown for the sake of simplicity and clarity. This cooperating set selection apparatus is used in a wireless communication system, and it is possible to perform the cooperating set selection method described with reference to FIG. 1 in the cooperating set selection apparatus 400.

As shown in FIG. 4, the cooperating set selection apparatus 400 may include a transmission mode determination unit 410 and a cooperating set selection unit 420.

Particularly, the transmission mode determination unit 410 may be configured to determine a transmission mode utilized by the wireless communication system, where the transmission mode is Joint Processing or Coordinated Scheduling/Beamforming; and the cooperating set selection unit 420 may be configured to select a cooperating set based on a cooperating set selection mechanism corresponding to the transmission mode utilized by the wireless communication system.

It becomes clear how to implement the cooperating set selection apparatus 400 and functions of its respective constituent units by reading the description about corresponding processing given above, and no more description will be made herein.

It is to be illustrated that the structure of the cooperating set selection apparatus 400 as shown in FIG. 4 is merely exemplary, those skilled in the art may modify the block diagram shown in FIG. 4 as required.

The basic principles of the invention have been described in combination with specific embodiments above, however, it is to be noted that those skilled in the art is capable of understanding that all or any steps or components of the method and apparatus of the invention may be implemented with hardware, firmware, software or combinations thereof in any computing apparatus (including a processor, storage medium and so on) or a network of computing apparatuses, which can be implemented by those skilled in the art operating their basic programming skills after reading the specification of the invention.

Therefore, the object of the invention may also be implemented by running any one program or one set of programs on any computing apparatus which may be well-known general purpose apparatus. Thus, the object of the invention may also be implemented by simply providing a program product containing program codes implementing the method or apparatus. This is to say, such a program product as well as a storage medium storing such a program product therein also constitute the present invention. It is apparent that the storage medium may be am well-known storage medium or any storage medium to be developed in the future.

It is also to be noted that in the apparatus and method of the invention, each component or each step can apparently be decomposed and/or recombined. These decompositions and/or re-combinations should be regarded as equivalent schemes of the invention. Moreover, the steps carrying out the series of processes mentioned above may be naturally performed chronologically in an order of description but not necessarily. Some of the steps may be carried out in parallel or independently from one another.

Although the invention and advantages thereof have been described in detail, it should be understood that various changes, replacements and alternations may be affected therein without departing from the scope and spirit of the invention defined by the appended claims. Furthermore, the terms "comprise," "include," or any other variations thereof in the application are intended to cover a non-exclusive inclusion, so that a process, method, article, or apparatus that comprises a list of elements includes not only those elements but also other elements not explicitly listed or inherent to such process, method, article, or apparatus. An element defined by a sentence "comprises . . . a/an" does not, without more constraints, preclude the existence of additional identical element(s) in the process, method, article, or apparatus that comprises the element.

What is claimed is:

1. A cooperating set selection method for use in a wireless communication system, comprising:

specifying which one transmission mode of Joint Processing and Coordinated Scheduling/Beamforming is utilized in the wireless communication system;

selecting, based on the specified transmission mode utilized in the wireless communication system, a cooperating set selection mechanism from among a plurality of different cooperating set selection mechanisms, a first cooperating set selection mechanism being selected in a case that the specifying specifies the Joint Processing is utilized as a transmission mode, a second cooperating set selection mechanism being selected in a case that the specifying specifies the Coordinated Scheduling/Beamforming is utilized as a transmission mode, the first cooperating set selection mechanism being different from the second cooperating set selection mechanism; and selecting, as a cooperating set, a set of transmission nodes to be used in the wireless communication system for data transmission in the Joint Processing or the Coordinated Scheduling/Beamforming in accordance with the selected cooperating set selection mechanism, transmission nodes not selected as the cooperating set being not used in the wireless communication system for data transmission in the Joint Processing or the Coordinated Scheduling/Beamforming, wherein the second cooperating set selection mechanism is based on a terminal, in which cooperating sets are individually selected for respective terminals in the same cell such that, for a first terminal in a first cell, a first cooperating set corresponding to a first set of transmission nodes to be used in the wireless communication system for data transmission is selected while, for a second terminal in the first cell, a second cooperating set corresponding to a second set of transmission nodes to be used in the wireless communication system for data transmission is selected, the second set of transmission nodes being different from the first set of transmission nodes.

2. The cooperating set selection method according to claim 1, wherein the wireless communication system includes a homogeneous network and a heterogeneous network, and in the selection of the cooperating set, a cooperating set selection mechanism for the homogeneous network or the heterogeneous network is adopted further according to different interference characteristics of the homogeneous network and the heterogeneous network.

3. The cooperating set selection method according to claim 2, wherein in a case that the transmission mode utilized in the wireless communication system is the Coordinated Scheduling/Beamforming, the corresponding cooperating set selection mechanism includes the selection mechanism based on a terminal, and, regarding a first terminal of a selected cooperating set and a first cell where the first terminal is positioned, in a case that the first cell is positioned in the homogeneous network, a cell whose distance from the first cell is smaller than a predetermined distance threshold is selected as a candidate cooperating set on the basis of a distance criterion, whereas, in a case of the heterogeneous network, a candidate cooperating set is selected on the basis of not only the distance criterion, but also whether the first cell is a macro cell or a micro cell and whether or not the macro cell and a micro cell falling within a cover range of the macro cell use the same cell number, and then, based on a SLNR criterion of Signal to Leakage and Noise Ratio, a cell having smaller SLNR than a predetermined SLNR threshold is selected from the candidate cooperating set as a cooperating set for providing a service to the first terminal.

4. The cooperating set selection method according to claim 2, wherein
in a case that the transmission mode of Joint Processing is utilized by the wireless communication system, a candidate cooperating set is selected first, and then a cooperating cell-user pair set is selected on the basis of the selected candidate cooperating to form a multi-cell and multi-user transmission mode.

5. The cooperating set selection method according to claim 4, wherein
in order to select the candidate cooperating set, in a case that a first cell of a selected cooperating set is positioned in the homogeneous network, the candidate cooperating set is formed by selecting a cell whose physical distance from the first cell is smaller than a predetermined distance threshold on the basis of a distance criterion, whereas, in a case that the first cell is positioned in the heterogeneous network, an appropriate cell is selected on the basis of a signal quality criterion to form a candidate cooperating set, and a difference value between a first signal quality of the appropriate cell for an edge user of the first cell and a second signal quality of the first cell for the edge user is equal to or less than a predetermined difference value threshold.

6. The cooperating set selection method according to claim 4, wherein
in order to select the cooperating cell-user pair set, for the homogeneous network, a cell-user pair set with an orthogonality greater than a predetermined orthogonality threshold is selected, and then the cell-user pair set with a best overall signal quality is selected based on the signal quality criterion, whereas for the heterogeneous network, on the basis of the selection of the homogeneous network, and the cell-user pair set in which interference caused by a macro cell on a micro cell is smaller than a predetermined interference threshold is selected.

7. A cooperating set selection apparatus for use in a wireless communication system, comprising:
a memory; and
circuitry configured to
specify which one transmission mode of Joint Processing and Coordinated Scheduling/Beamforming is utilized in the wireless communication system;
select, based on the specified transmission mode utilized in the wireless communication system, a cooperating set selection mechanism from among a plurality of different cooperating set selection mechanisms, a first cooperating set selection mechanism being selected in a case that the specifying specifies the Joint Processing is utilized as a transmission mode, a second cooperating set selection mechanism being selected in a case that the specifying specifies the Coordinated Scheduling/Beaming is utilized as a transmission mode, the first cooperating set selection mechanism being different from the second cooperating set selection mechanism; and
select, as a cooperating set, a set of transmission nodes to be used in the wireless communication system for data transmission in the Joint Processing or the Coordinated Scheduling/Beamforming in accordance with the selected cooperating set selection mechanism, transmission nodes not selected as the cooperating set being not used in the wireless communication system for data transmission in the Joint Processing or the Coordinated Scheduling/Beamforming, wherein
the second cooperating set selection mechanism is based on a terminal, in which cooperating sets are individually selected for respective terminals in the same cell such that, for a first terminal in a first cell, a first cooperating set corresponding to a first set of transmission nodes to be used in the wireless communication system for data transmission is selected while, for a second terminal in the first cell, a second cooperating set corresponding to a second set of transmission nodes to be used in the wireless communication system for data transmission is selected, the second set of transmission nodes being different from the first set of transmission nodes.

8. The cooperating set selection apparatus according to claim 7, wherein
the wireless communication system includes a homogeneous network and a heterogeneous network, and in the selection of the cooperating set, a cooperating set selecting unit further adopts a cooperating set selection mechanism for the homogeneous network or the heterogeneous network according to different interference characteristics of the homogeneous network and the heterogeneous network.

9. The cooperating set selection apparatus according to claim 8, wherein
in a case that the transmission mode utilized in the wireless communication system is the Coordinated Scheduling/Beamforming, the corresponding cooperating set selection mechanism includes the selection mechanism based on a terminal, and, regarding a first terminal of a selected cooperating set and a first cell where the first terminal is positioned, in a case that the first cell is positioned in the homogeneous network, a cell whose distance from the first cell is smaller than a predetermined distance threshold is selected as a candidate cooperating set on the basis of a distance criterion, whereas, for the heterogeneous network, a candidate cooperating set is selected on the basis of not only the distance criterion, but also whether the first cell is as macro cell or a micro cell and whether or not the macro cell and a micro cell falling within a cover range of the macro cell use the same cell number, and then, based on a SLNR criterion of Signal to Leakage and Noise Ratio, a cell having smaller SLNR than a predetermined SLNR threshold is selected in the candidate cooperating set as a cooperating set for providing a service to the first terminal.

10. The cooperating set selection apparatus according to claim 8, wherein
in a case that the Transmission mode of Joint Processing is utilized by the wireless communication system, a candidate cooperating set is selected first, and then a cooperating cell-user pair set is selected on the basis of the selected candidate cooperating set to form a multi-cell and multi-user transmission mode.

11. The cooperating set selection apparatus according to claim 10, wherein
in order to select the candidate cooperating set, in a case that a first cell of a selected cooperating set is positioned in the homogeneous network, the candidate cooperating set is formed by selecting a cell whose physical distance from the first cell is smaller than a predetermined distance threshold on the basis of a distance criterion, whereas, in a case that the first cell is positioned in the heterogeneous network, an appropriate cell is selected on the basis of a signal quality criterion to form a candidate cooperating set, and a difference value between a first signal quality of the appropriate cell for an edge user of the first cell and a second signal quality of the first cell for the edge user is equal to or less than a predetermined difference value threshold.

12. The cooperating set selection apparatus according to claim 10, wherein
in order to select the cooperating cell-user pair set, for the homogeneous network, a cell-user pair set with an orthogonality greater than a predetermined orthogonality threshold is selected, and then the cell-user pair set with a best overall signal quality is selected based on the signal quality criterion, whereas for the heterogeneous network, on the basis of the selection of the homogeneous network, and the cell-user pair set in which interference caused by a macro cell on a micro cell is smaller than a predetermined interference threshold is selected.

13. A non-transitory computer-readable storage medium including executable instructions, which when executed by a computer cause the computer to execute a cooperating set selection method for use in a wireless communication system, the cooperating set selection method including:
specifying which one transmission mode of Joint Processing and Coordinated Scheduling/Beamforming is utilized in the wireless communication system;
selecting, based on the specified transmission mode utilized in the wireless communication system, a cooperating set selection mechanism from among a plurality of different cooperating set selection mechanisms, a first cooperating set selection mechanism being selected in a case that the specifying specifies the Joint Processing is utilized as a transmission mode, a second cooperating set selection mechanism being selected in a case that the specifying specifies the Coordinated Scheduling/Beamforming is utilized as a transmission mode, the first cooperating set selection mechanism being different from the second cooperating set selection mechanism; and
selecting, as a cooperating set, a set of transmission nodes to be used in the wireless communication system for data transmission in the Joint Processing or the Coordinated Scheduling/Beamforming in accordance with the selected cooperating set selection mechanism, transmission nodes not selected as the cooperating set being not used in the wireless communication system for data transmission in the Joint Processing or the Coordinated Scheduling/Beamforming, wherein
the second cooperating set selection mechanism is based on a terminal, in which cooperating sets are individually selected for respective terminals in the same cell such that, for a first terminal in a first cell, a first cooperating set corresponding to a first set of transmission nodes to be used in the wireless communication system for data transmission is selected while, for a second terminal in the first cell, a second cooperating set corresponding to a second set of transmission nodes to be used in the wireless communication system for data transmission is selected, the second set of transmission nodes being different from the first set of transmission nodes.

14. A communication terminals in a wireless communication system, comprising:
a memory; and
circuitry configured to communicate with a cell in a cooperating set based on a transmission mode utilized in the wireless communication system the transmission mode being Joint Processing or Coordinated Scheduling/Beamforming, wherein
which one transmission mode of Joint Processing and Coordinated Scheduling/Beamforming is utilized in the wireless communication system is specified by the wireless communication system,
based on the specified transmission mode utilized in the wireless communication system, a cooperating set selection mechanism is selected from among a plurality of different cooperating set selection mechanisms by the wireless communication system, a first cooperating set selection mechanism being selected in a case that the wireless communication system specifies the Joint Processing is utilized as a transmission mode a second cooperating set selection mechanism being selected in a case that the wireless communication system specifies the Coordinated Scheduling/Beamforming is utilized as a transmission mode, the first cooperating set selection mechanism being different from the second cooperating set selection mechanism,
a set of transmission nodes to be used in the wireless communication system for data transmission in the Joint Processing or the Coordinated Scheduling/Beamforming is selected as the cooperating set based on the selected cooperating set selection mechanism, transmission nodes not selected as the cooperating set being not used in the wireless communication system for data transmission in the Joint Processing or the Coordinated Scheduling/Beamforming, and
the second cooperating set selection mechanism is based on a terminal, in which cooperating sets are individually selected for respective terminals in the same cell such that, for the communication terminal in a first cell, a first cooperating set corresponding to a first set of transmission nodes to be used in the wireless communication system for data transmission is selected while, for a second terminal in the first cell, a second cooperating set corresponding to a second set of transmission nodes to be used in the wireless communication system for data transmission is selected, the second set of transmission nodes being different from the first set of transmission nodes.

15. A communication method for use in a communication terminal in a wireless communication system, comprising:
communicating with a cell in a cooperating set based on a transmission mode utilized in the wireless communication system, the transmission mode being Joint Processing or Coordinated Scheduling/Beamforming, wherein
which one transmission mode of Joint Processing and Coordinated Scheduling/Beamforming is utilized in the wireless communication system is specified by the wireless communication system,
based on the specified transmission mode utilized in the wireless communication system, a cooperating set selection mechanism is selected from among a plurality of different cooperating set selection mechanisms by the wireless communication system, a first cooperating set selection mechanism being selected in a case that the wireless communication system specifies the Joint Processing is utilized as a transmission mode, a second cooperating set selection mechanism being selected in a case that the wireless communication system specifies the Coordinated Scheduling/Beamforming is utilized as a transmission mode, the first cooperating set selection mechanism being different from the second cooperating set selection mechanism, a set of transmission nodes to be used in the wireless communication system for data transmission in the Joint Processing or the Coordinated Scheduling/Beamforming is selected as the cooperating set based on the selected cooperating set selection mechanism, transmission nodes not selected as the cooperating set being not used in the wireless communication system for data transmission in the Joint Processing or the Coordinated Scheduling/Beamforming, and the second cooperating set selection mechanism is based on a terminal, in which cooperating sets are individually selected for respective terminals in the same cell such that, for the communication terminal in a first cell, a first cooperating set corresponding to a first set of transmission nodes to be used in the wireless communication system for data transmission is selected while, for a second terminal in the first cell, a second cooperating set corresponding to a second set of transmission nodes to be used in the wireless communication system for data transmission is selected, the second set of transmission nodes being different from the first set of transmission nodes.

* * * * *